United States Patent [19]
Walters

[11] 4,137,125
[45] Jan. 30, 1979

[54] METHOD OF WELDING NUCLEAR REACTOR FUEL ASSEMBLIES

[75] Inventor: John M. Walters, Orangeburg, S.C.

[73] Assignee: Westinghouse Electric Corp., Pittsburgh, Pa.

[21] Appl. No.: 741,436

[22] Filed: Nov. 12, 1976

[51] Int. Cl.² .......................... G21C 3/30; B23K 9/28; B23K 5/00

[52] U.S. Cl. .................................. 176/78; 219/86.24; 266/64

[58] Field of Search ...................... 176/78; 219/86, 87; 266/58, 64; 408/3; 90/62 R

[56] References Cited

U.S. PATENT DOCUMENTS

| | | | |
|---|---|---|---|
| Re. 9,114 | 3/1880 | Gardner | 408/3 |
| 2,250,845 | 7/1941 | Stefano | 408/3 |
| 2,451,123 | 10/1948 | Schultz | 408/3 |
| 2,464,906 | 3/1949 | Unger | 219/87 |
| 2,614,198 | 10/1952 | Avery | 219/86 |
| 2,931,887 | 4/1960 | Leist | 219/87 |
| 3,417,477 | 12/1968 | Nowotny | 266/64 |
| 3,430,028 | 2/1969 | Goforth | 219/86 |
| 3,562,482 | 2/1971 | Friedberg | 219/86 |
| 3,791,466 | 2/1974 | Patterson | 176/78 |

Primary Examiner—Samuel W. Engle
Assistant Examiner—Donald P. Walsh
Attorney, Agent, or Firm—J. R. Campbell; Z. L. Dermer

[57] ABSTRACT

A method of welding tabs projecting outwardly from grip straps in a fuel assembly grid to a control rod guide thimble positioned in a cell in the grid including providing a weld guide having openings therein which receive dimples on the strap when the weld guide is placed in a cell adjacent to the cell containing the control rod guide thimble. The weld guide includes an opening which falls into alignment with a tab so that when a welding gun electrode is placed through the opening and into contact with a tab, the other electrode is automatically centered on its tab thus permitting accurate spot welding of the parts. To make a second spot weld on the same tab but at a point outwardly from the first spot weld, a second weld guide having an opening therein displaced a greater distance from a reference point on the weld guide, is placed in the same cell and the welding process repeated.

3 Claims, 7 Drawing Figures

METHOD OF WELDING NUCLEAR REACTOR FUEL ASSEMBLIES

BACKGROUND OF THE INVENTION

The invention described herein relates to grids for nuclear reactor fuel assemblies and more particularly to a method for accurately welding tabs projecting upwardly from fuel assembly grids to control rod guide thimbles disposed in cells located in the grids.

Each fuel assembly for a nuclear reactor includes multiple fuel rods and control rod guide thimbles in which the reactor control rods vertically move to control the reactor power output. These fuel rods and control rod guide thimbles are held in spaced relationship with each other by a grid of egg crate configuration. The fuel rods and control rod guide thimbles extend axially through square openings formed by interleaved plates or straps comprising the grid. Since water coolant flows through the fuel assembly under relatively high velocity and pressure, it is necessary to weld or otherwise secure the grid to the control rod thimbles. This is accomplished by welding tabs projecting upwardly from certain of the grid straps to opposite sides of each guide thimble to thus provide a strong but relatively flexible construction.

According to present practices, each control rod guide thimble is placed in its appropriate grid opening and electrodes then weld the tabs to opposite sides of the guide thimble. Since manufacturing specifications require that the electrodes be clamped to the parts with a force of at least 50 psi, relative movement of the electrodes and parts during the clamping process often causes mislocated weld nuggets on the weld tab. Since the grid assembly is made to exacting tolerances, the mislocation of weld nuggets on the weld tabs often results in rejection of the grid which obviously increases manufacturing cost. Also, misalignment of electrodes on the parts will often result in burning of the tabs sufficiently severe to place them beyond further use.

SUMMARY OF THE INVENTION

Briefly stated, the above described disadvantages are overcome by this invention by providing a weld nugget locator or weld guide which acts to orient the electrodes on the centerline of tabs disposed on opposite sides of a control rod guide thimble extending axially through a fuel assembly grid. The weld guide is equipped with holes which encompass either dimples or springs on the grid straps thus permitting the weld guide to lie flat against the grid strap surface. The weld guide further includes a shoulder which rests on the upper edge of a strap thus accurately positioning the guide in the grid and providing a precise point at which the grid tabs are welded to the guide thimble extending axially therethrough. To apply a spot weld to a precise point on the grid tabs, the weld guide is equipped with an opening which locates an exact spot on the centerline of the tabs when the weld guide is placed in a grid cell adjacent to the grid cell which contains a control rod guide thimble. After a first spot weld is made, a second spot weld extending axially outward therefrom may then be made by utilizing a second weld guide of the same design but having the electrode opening therein spaced a distance outward from a reference point slightly greater than the first opening. This greater distance which may be in the neighborhood of ⅛ inch permits applying a second spot weld to the tabs to thus provide a completely welded assembly.

BRIEF DESCRIPTION OF THE DRAWING

While the specification concludes with claims particularly pointing out and distinctly claiming the subject matter of the invention, it is believed the invention will be better understood from the following description taken in connection with the accompanying drawing, wherein:

DESCRIPTION OF THE PREFERRED EMBODIMENT

Figure 1:
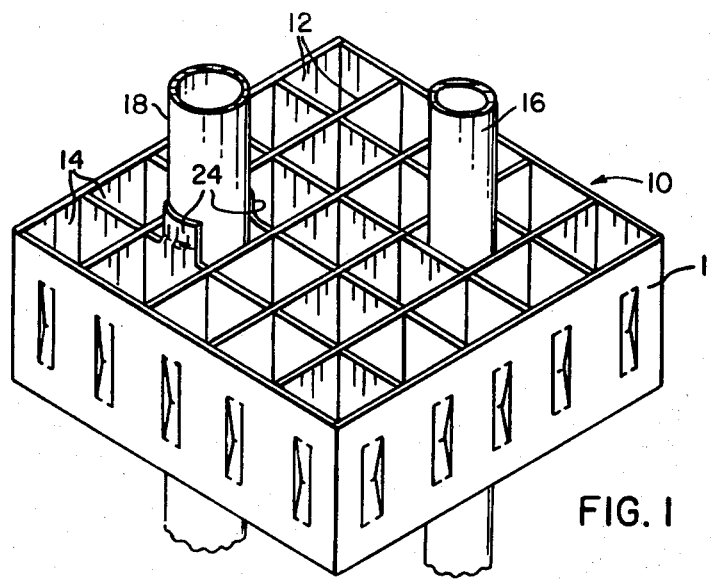
FIG. 1 is an isometric view generally showing the relationship of the fuel assembly fuel rods, control rod guide thimbles and a fuel assembly grid.
Figure 3:
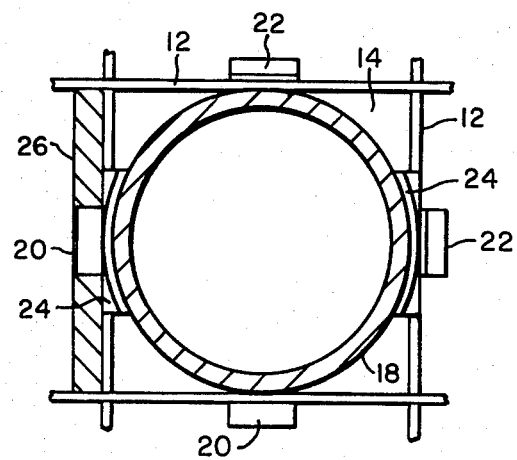
FIG. 3 is a plan view of one cell of a grid illustrating a control rod guide thimble therein and including the disposition of dimples and a weld guide used in carrying out the welding process.
Figure 2:
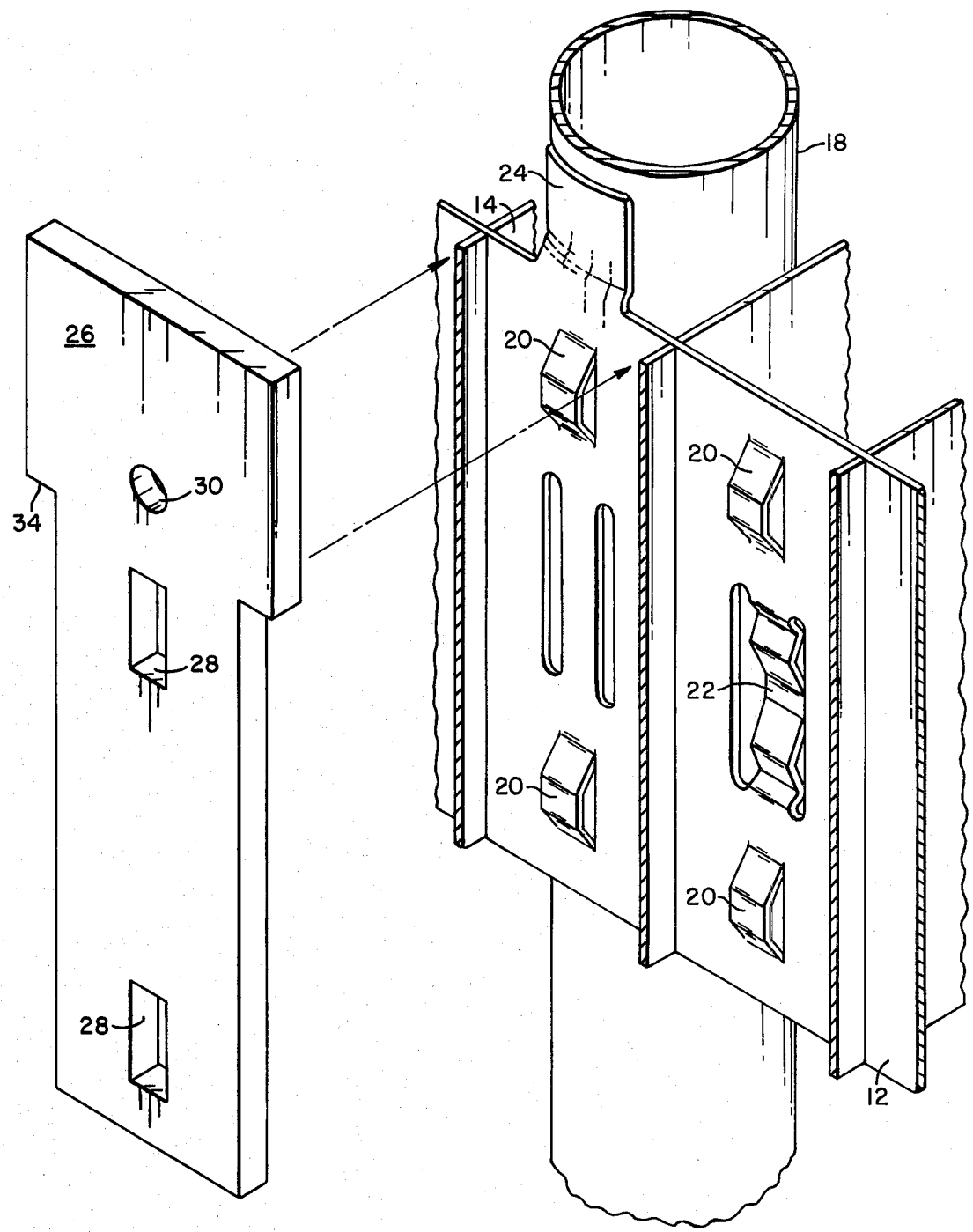
FIG. 2 is an exploded view illustrating how the parts are assembled to permit carrying out the welding process.

Referring now to the drawings wherein like reference characters designate like or corresponding parts throughout the several views, there is shown in FIG. 1 a conventional fuel assembly grid 10 which includes multiple interleaved plates or grid straps 12 arranged to form egg crate openings or cells 14 through which multiple fuel rods 16 and control rod guide thimbles 18 axially extend. The side of straps 12 forming each cell includes a pair of dimples 20 on two adjacent straps while the remaining two adjacent sides includes springs 22, the arrangement being such that according to well known designs, each fuel rod is supported by the dimples and springs. Since each control rod guide thimble is of greater diameter than a fuel rod, the plates or straps are designed such that neither dimple nor springs will project into the cell into which a control rod guide thimble is inserted. As illustrated in FIGS. 2 and 3, the control rod guide thimble fully occupies the cell area formed by the interleaved grid straps. Dimples 20 and springs 22 project into the adjacent cells but not into the cell containing a control rod guide thimble. In order to withstand the hydraulic forces acting on fuel assembly grids during operation, the grid straps forming the cell in which the control rod guide thimble axially extend includes a tab 24 which is welded to opposite sides of the guide thimble thus providing a firm structure which is not displaced by axially directed hydraulic forces. Past operating experience has shown this grid design to be efficient, reliable and safe in operation.

Figure 4:
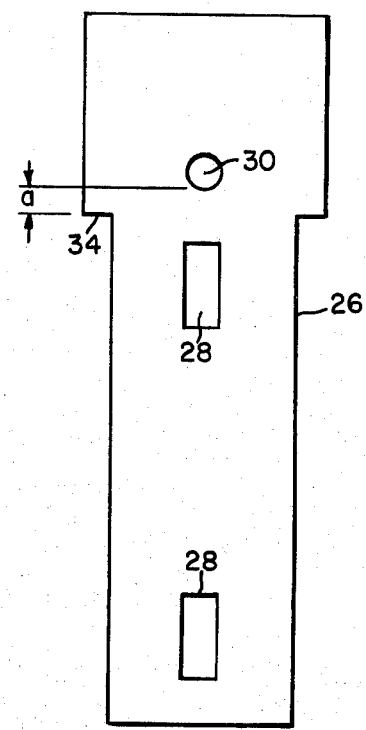
FIG. 4 illustrates one design of weld guide used in carrying out the welding process.

As indicated above, the major problem encountered during the manufacturing process is that of accurately welding the grid strap tabs 24 to the outer surface of the control rod guide thimble. In accordance with this invention, the electrodes 25 of a weld gun are accurately located in position relative to the tabs by a weld guide 26 which is removable after each use. Two separate weld guides of the same design are used. The first weld guide 26 illustrated in FIGS. 2 and 4 is of T-shaped configuration and includes a pair of openings 28 of a size to accept dimples 20 which project outwardly into the cell which is adjacent the cell holding a control rod guide thimble. The weld guide also includes a circular opening 30 of a size sufficient to accept an electrode on the welding gun.

In assembling the parts to carry out the welding operation, multiple control rod guide thimbles are placed in the grid which is positioned horizontally on a bench. A weld guide is then placed in a cell adjacent to the cell containing a control rod guide thimble to which the tabs 24 are to be welded. The outward projection 34 from the top of the T-shaped weld guide rests on top the grid straps while the weld guide openings 28 receive their corresponding dimples 20 or springs 22. When in this position, opening 30 which is adapted to receive an electrode is aligned in the center of a tab and a short distance from the top of grid strap 12. When an electrode tip 25 is placed in the hole 30, the electrode 25' on the other side of the gun also is correctly aligned with the grid tab on that side. The gun is then energized to provide a spot weld in a precise location on the tab and control rod guide thimble.

Figure 5:
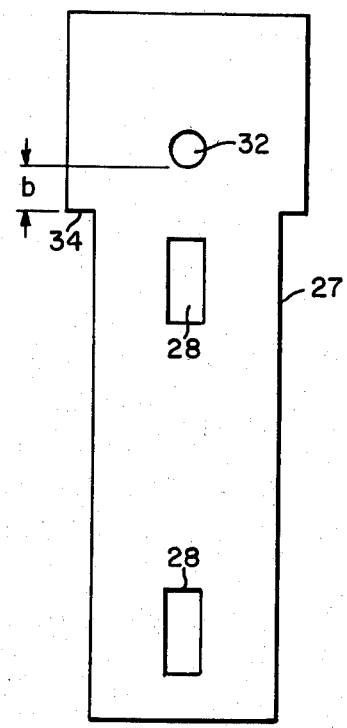
FIG. 5 illustrates a substantially identical weld guide except for the position of a electrode opening therein.
Figure 6:
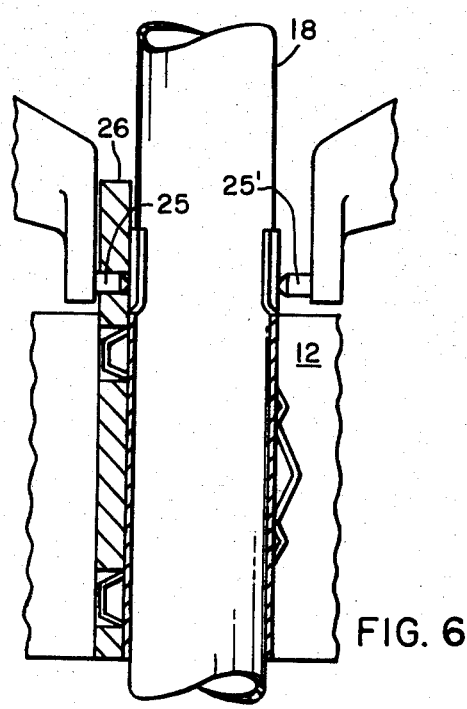
FIG. 6 is a plan view showing how the weld guide of FIG. 4 fits into a fuel assembly grid.

Since the tabs are about ¼ inch long and two axially extending welds must be made thereon, a second weld guide 27 is used to accurately locate the second spot weld. As shown in FIG. 5, the second weld guide is identical to the weld guide of FIG. 4 except that distance b, the location of opening 32 from the bottom 34 of the T, is greater than distance a in FIG. 4. Therefore, when weld guide 26 is removed from its position on the grid after the first spot weld is made, and weld guide 27 inserted in its place, the opening 32 will appear a greater distance outwardly on the tab. When the electrode is placed in opening 32 and the second spot weld made, it will appear a greater distance outwardly on the tab. Each tab then contains two spot welds.

Figure 7:
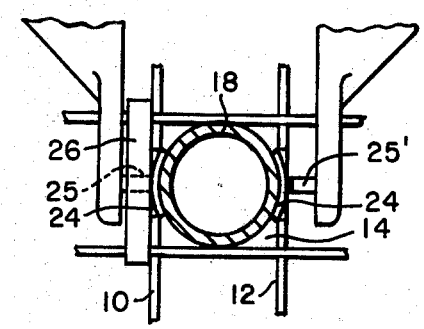
FIG. 7 is a side view of the parts illustrating how the electrode extends through the weld guide and into contact with tabs on opposite sides of a control rod guide thimble.

FIG. 7 shows the relative position of grid plates, weld guide and control rod guide thimble and electrodes immediately at the time of welding.

It will be apparent that many modifications and variations are possible in light of the above teachings. It therefore is to be understood that within the scope of the appended claims the invention may be practiced other than as specifically described.

I claim:

1. A method of welding control rod guide thimbles to tabs formed on fuel assembly grid straps which define the cells in which the guide thimbles are located comprising the steps of:
    placing control rod guide thimbles in cells provided in a fuel assembly grid;
    positioning a weld guide in a cell adjacent the cell containing a control rod guide thimble;
    supporting the weld guide on said grid straps, and accurately locating an opening in the weld guide with the approximate centerline of said tabs;
    inserting one electrode of a welding gun through said opening and into contact with a tab to be welded to a guide thimble;
    locating the other electrode on the side opposite of the guide thimble and against the other tab;
    clamping the welding gun electrodes to the tab and control rod guide thimbles, and
    passing current through said electrodes to effect a first spot welding of said tabs to the control rod guide thimble.

2. The method according to claim 1, including the step of supporting the weld guide on dimples formed on the grid straps which project into the cell adjacent the cell containing a control rod guide thimble to thereby accurately locate said opening in the weld guide with said tab.

3. The method according to claim 1, including the step of removing said weld guide from its position in said cell;
    inserting a similar weld guide in said cell and aligning an electrode opening therein with said tab and in a position relative thereto such that the opening lies on a line extending upwardly on the tab from the first spot weld;
    clamping the welding gun electrodes to the tabs and control rod guide thimbles; and
    passing current through said electrode to effect a second spot welding of said tabs to the control rod guide thimble.

* * * * *